United States Patent [19]

Sunada et al.

[11] Patent Number: 5,666,863

[45] Date of Patent: Sep. 16, 1997

[54] HYDRAULIC PRESSURE CONTROL SYSTEM FOR HYDRAULICALLY OPERATED VEHICLE TRANSMISSION

[75] Inventors: Satoru Sunada; Masamitsu Fukuchi, both of Wako, Japan

[73] Assignee: Honda Giken Kogyo Kabushiki Kaisha, Tokyo, Japan

[21] Appl. No.: 575,382

[22] Filed: Dec. 20, 1995

[30] Foreign Application Priority Data

Dec. 28, 1994 [JP] Japan .................................. 6-339952

[51] Int. Cl.$^6$ ................................................ F16H 61/06
[52] U.S. Cl. .................... 74/731.1; 74/336 R; 192/87.18; 192/109 F
[58] Field of Search ............................ 74/336 R, 731.1; 192/87.13, 87.18, 109 F; 477/176, 154

[56] References Cited

U.S. PATENT DOCUMENTS

| | | | |
|---|---|---|---|
| 4,497,222 | 2/1985 | Nagaoka et al. | 74/336 R X |
| 4,519,484 | 5/1985 | Nagaoka et al. | 74/336 R X |
| 4,790,418 | 12/1988 | Brown et al. | 74/336 R X |
| 5,370,016 | 12/1994 | Fujita et al. | 74/336 R |
| 5,475,595 | 12/1995 | Asahara et al. | 74/336 R X |

FOREIGN PATENT DOCUMENTS 60-231056   11/1985   Japan .

*Primary Examiner*—Rodney H. Bonck
*Attorney, Agent, or Firm*—Armstrong, Westerman, Hattori, McLeland & Naughton

[57] ABSTRACT

A hydraulic pressure system for a frictional engaging element such as clutches for a vehicle automatic transmission. The engagement state of the clutches is detected from the clutch slip rate, and the desired change rate of the rotational speed of the transmission input shaft (the main shaft rotational speed) during the gearshift operation period is varied based thereon. The hydraulic pressures supplied to the clutches are controlled for bringing the actual rotational speed change rate to the desired value. Since the clutch engagement state can therefore be controlled based on the desired value, irrespective of the temperature of the oil (ATF) and aging of the clutches, it is at all times possible to secure optimum gearshift characteristics and to avoid the occurrence of gearshift shock.

5 Claims, 4 Drawing Sheets

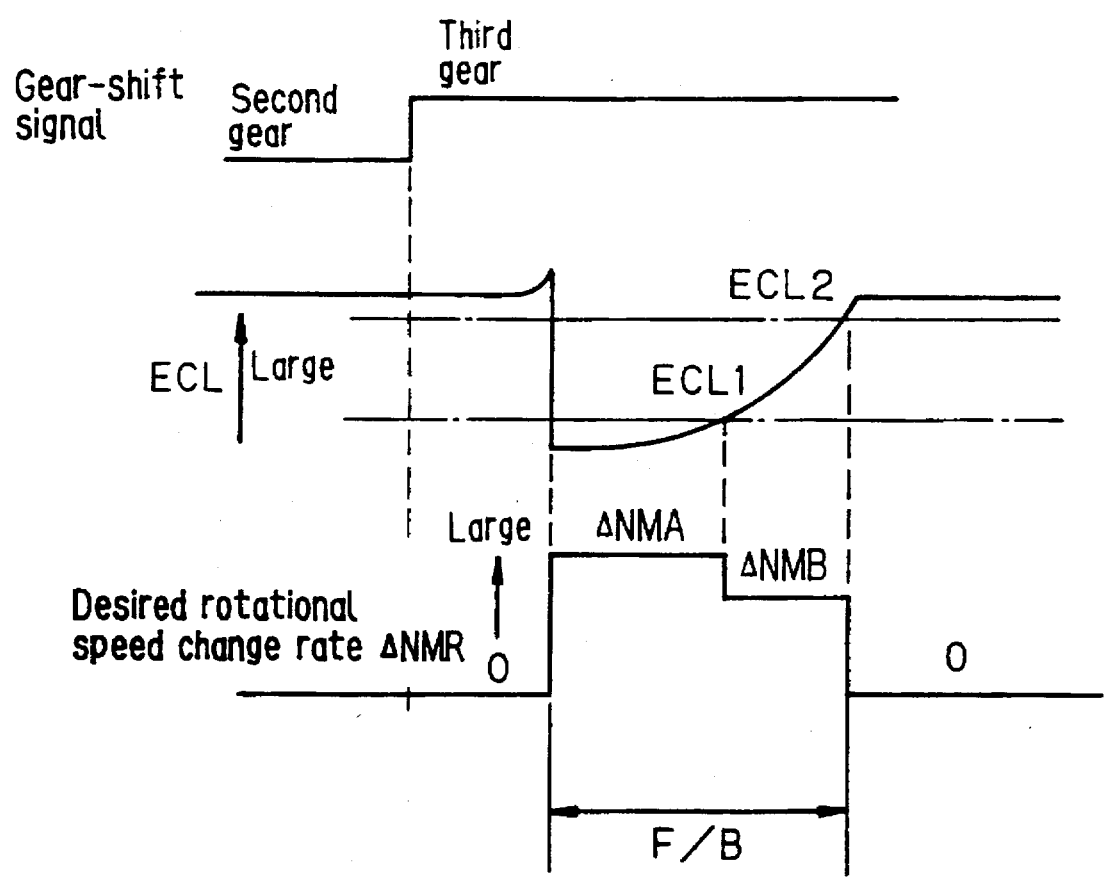

HYDRAULIC PRESSURE CONTROL SYSTEM FOR HYDRAULICALLY OPERATED VEHICLE TRANSMISSION

BACKGROUND OF THE INVENTION

1. Field of the Invention

This invention relates to a hydraulic pressure control system for a hydraulically operated vehicle transmission, more particularly to a hydraulic control system for a hydraulically operated vehicle automatic transmission which determines a clutch hydraulic (oil) pressure control value taking into account the clutch engagement state.

2. Description of the Prior Art

In prior-art hydraulic pressure control systems for a hydraulically operated vehicle automatic transmission, it is a common practice to control the hydraulic pressures of the clutches, brakes and other frictional engaging elements. Japanese Laid-Open Patent Application No. Sho 60(1985)-231,056, for instance, teaches a technique controlling the hydraulic pressures applied to frictional engaging elements so as to regulate the rotational speed of a member whose rotational speed changes during gear shifting, such as the transmission input shaft, so as to change following a desired rotational speed change rate.

In the prior-art systems, however, the desired rotational speed change rate is set to be time dependent and does not take the actual engagement state of the frictional engaging elements into consideration. This leads to problems because the viscosity of the oil (automatic transmission fluid (ATF)) varies greatly with temperature, and the engagement state of a frictional engaging element changes with aging. Specifically, cases arise in which the predicted engagement state on which the applied hydraulic pressure control value is predicated differs from the actual engagement state. As a result, unexpected gearshift shock is liable to occur.

An object of this invention is therefore to overcome this problem by providing a hydraulic pressure control system for a hydraulically operated vehicle transmission which avoids the occurrence of unexpected gearshift shock by determining a desired rotational speed change rate taking into account the actual engagement state of the frictional engaging element and by determining the hydraulic pressure control value based thereon.

SUMMARY OF THE INVENTION

This invention achieves this object by providing a system for controlling hydraulic pressure for a hydraulically operated vehicle transmission, including, a plurality of frictional engaging elements installed in the vehicle transmission, a hydraulic pressure supplying circuit for discharging hydraulic pressure from one of said plurality of frictional engaging elements and for supplying hydraulic pressure to another of said plurality of frictional engaging elements to bring them into operation such that gear shifting is effected in the vehicle transmission, shaft rotational speed detecting means for detecting a rotational speed of a shaft input to said vehicle transmission which changes at a time of said gear shifting, and hydraulic pressure control means for controlling the hydraulic pressure such that the rotational speed of the shaft changes following a desired rotational speed change rate. In the system, engagement state detecting means is provided for detecting an engagement state of at least either of said one and another of the plurality of frictional engaging elements and said hydraulic pressure control means changes the desired rotational speed change rate in response to the detected engagement state of said at least either of said one and another of the plurality of frictional engaging elements.

BRIEF EXPLANATION OF THE DRAWINGS

This and other objects and advantages of the invention will be more apparent from the following description and drawings, in which:

FIG. 4 is a timing chart showing the operation of the system illustrated in FIG. 3.

DETAILED DESCRIPTION OF THE PREFERRED EMBODIMENTS

An embodiment of the invention will now be explained with reference to the attached drawings.

Figure 1:
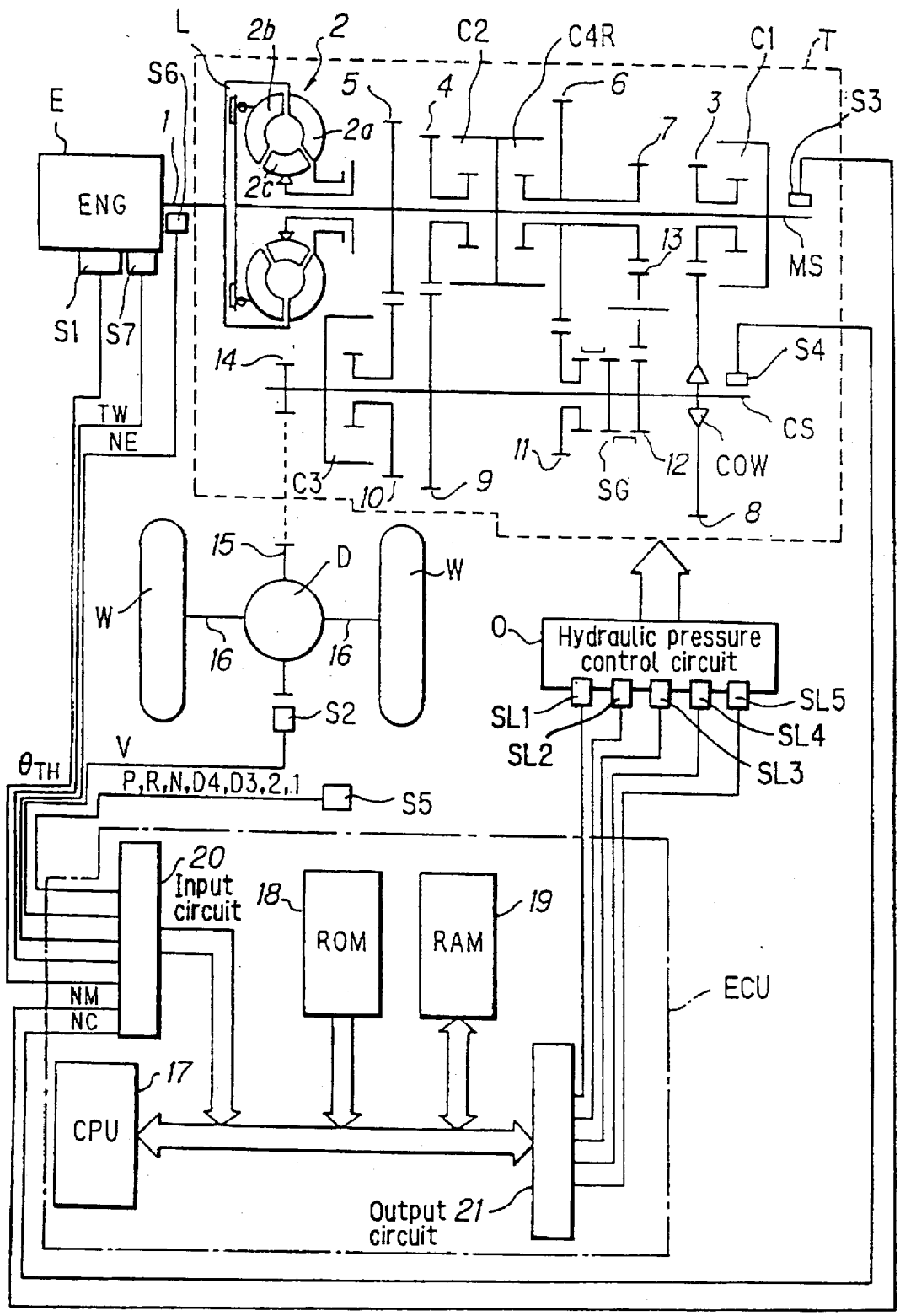
FIG. 1 is an overall view of the hydraulic pressure control system for a hydraulically operated vehicle transmission.

FIG. 1 is an overall view of the hydraulic pressure control system for a hydraulically operated vehicle transmission according to the invention.

As shown in FIG. 1, a vehicle automatic transmission T is equipped with a main shaft MS connected with a crankshaft 1 of an internal combustion engine E through a torque converter 2 having a lockup clutch L and with a countershaft CS connected with the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first gear is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second-fourth gears, the counter first-speed gear 8 is supported by a one-way clutch COW. The second gear is established when the main second-speed gear 4 rotatably supported on the main shaft MS is connected with the main shaft MS by a second-speed hydraulic clutch C2. The third gear is established when the counter third-speed gear 10 rotatably supported on the countershaft CS is connected with the countershaft CS by a third-speed hydraulic clutch C3.

The fourth gear is established when the counter fourth-speed gear 11 rotatably supported on the countershaft CS is connected with the countershaft CS by a selector gear SG and with this state maintained the main fourth-speed gear 6 rotatably supported on the main shaft MS is connected with the main shaft MS by a fourth-speed reverse hydraulic clutch C4R. The reverse gear is established when the counter reverse gear 12 rotatably supported on the countershaft CS is connected with the countershaft CS by the selector gear SG and with this state maintained the main reverse gear 7 rotatably supported on the main shaft MS is connected with the main shaft MS by the fourth-speed reverse hydraulic clutch C4R. The clutches C1, C2, C3 and C4R are the aforesaid frictional engaging elements.

The rotation of the countershaft. CS is transmitted through a final drive gear 14 and a final driven gear 15 to a differential D, from where it is transmitted to driven wheels W, W through left and right drive shafts 16, 16.

A throttle position sensor S1 is provided in an air intake pipe (not shown) of the engine E at a point in the vicinity of a throttle valve (not shown) for detecting the degree of opening or position θTH of the throttle valve. A vehicle speed sensor S2 for detecting the vehicle traveling speed V from the rotational speed of the final driven gear 15 is provided in the vicinity of the final driven gear 15. A transmission input shaft speed sensor S3 is provided in the vicinity of the main shaft MS for detecting the rotational speed NM of the transmission input shaft from the rotation of the main shaft MS, and a transmission output shaft speed sensor S4 is provided in the vicinity of the countershaft CS for detecting the rotational speed Nc of the transmission output shaft from the rotation of the countershaft CS.

A shift lever position sensor S5 is provided in the vicinity of a shift lever (not shown) installed on the vehicle floor near the driver's seat. The shift lever position sensor S5 detects which of the seven positions P, R, N, D4, D3, 2, 1 has been selected by the driver. A crank angle sensor S6 is provided in the vicinity of the crankshaft 1 of the engine E for detecting the engine speed NE from the rotation of the crankshaft 1, and a coolant temperature sensor S7 for detecting the engine coolant temperature TW is provided at an appropriate location on a cylinder block (not shown) of the engine E. Outputs of the sensors S1, etc., are sent to an ECU (electronic control unit).

The ECU is constituted as a microcomputer comprising a CPU (central processing unit) 17, a ROM (read-only memory) 18, a RAM (random access memory) 19, an input circuit 20 and an output circuit 21. The outputs of the sensors S1, etc., are input to the microcomputer through the input circuit 20. The CPU 17 of the microcomputer determines the gear (ratio) and energizes/deenergizes shift solenoids SL1, SL2 of a hydraulic control circuit O via the output circuit 21 so as to switch shift valves (not shown) and thereby engage/disengage the hydraulic clutches of prescribed gears, and controls the operation of the lockup clutch L of the torque converter 2 via control solenoids SL3 and SL4.

As will be explained later, the CPU 17 also controls the clutch hydraulic pressure by controlling a linear solenoid SL5. The CPU 17 further controls the solenoid SL5 through PWM (duty-ratio control).

Figure 2:
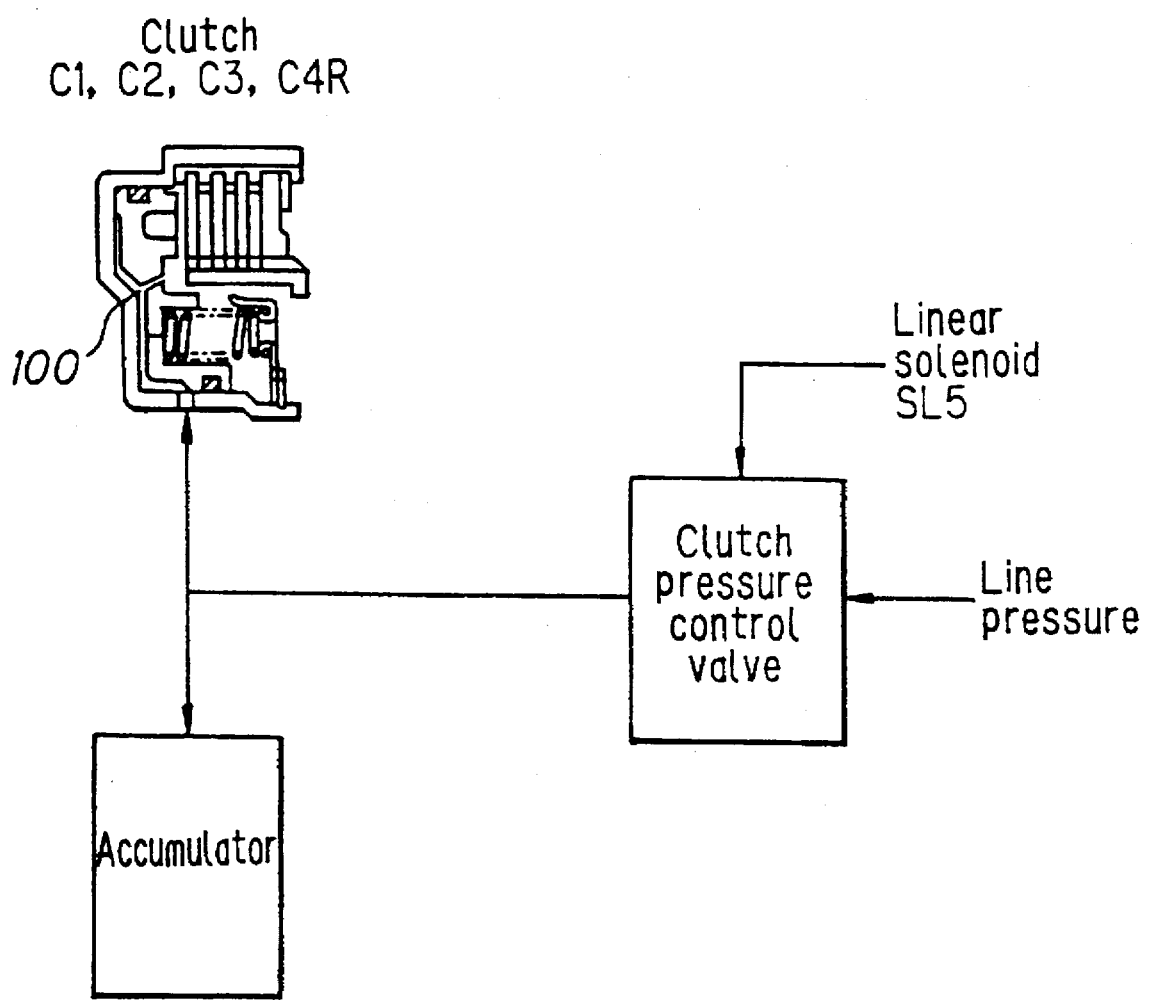
FIG. 2 is an explanatory view showing a part of the hydraulic control circuit of the system illustrated in FIG. 1.

FIG. 2 is an explanatory view showing a part of the hydraulic pressure control circuit O of the system of FIG. 1. Line pressure (primary pressure) supplied from a hydraulic pressure source (not shown) is regulated by the aforesaid linear solenoid SL5 and is sent to a clutch pressure control valve. The clutch pressure control valve regulates the line pressure within a prescribed throttle pressure range and supplies it to the clutches C1, C2, C3 and C4R. An accumulator is provided in the path to absorb surge pressure.

Thus, in this embodiment, the CPU 17 regulates the line pressure by using the linear solenoid SL5 to control the clutch pressure control valve so that, as explained later, the pressures supplied to the clutches are controlled to the desired value. As shown in FIG. 2, each of the clutches C1, C2, C3 and C4R is provided with a clutch valve 100 for discharge of centrifugal hydraulic pressure. Centrifugal pressure is discharged at the time of clutch release.

The operation of the hydraulic pressure control system for a hydraulically operated vehicle transmission according to the invention will now be explained with reference to the flowchart of FIG. 3.

The program of this flowchart is actuated once every 20 ms.

Figure 3:
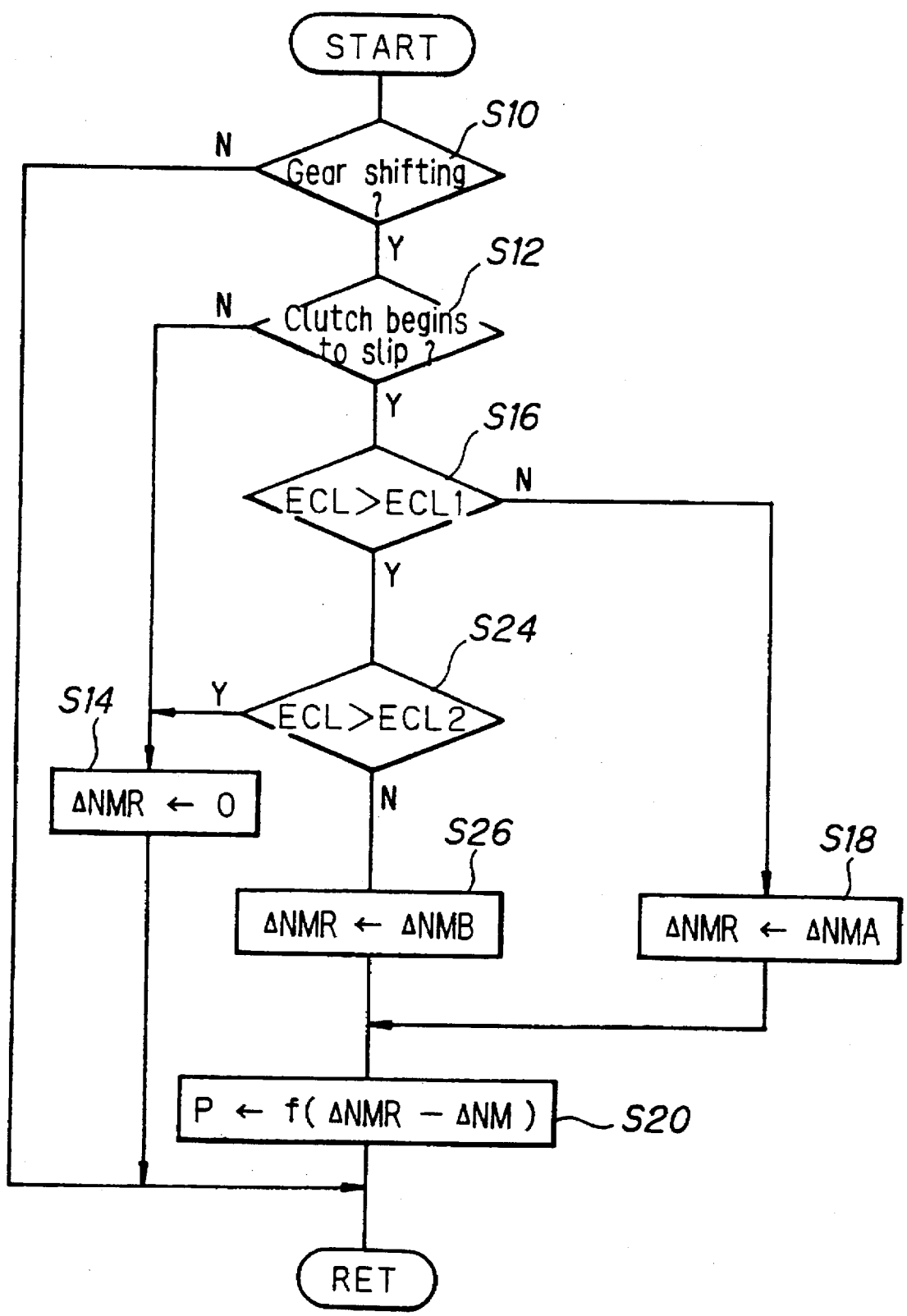
FIG. 3 is a flowchart showing the operation of the system illustrated in FIG. 1.

FIG. 4 is a timing chart for explaining the procedures of the flowchart of FIG. 3.

In FIG. 3, the program starts at S10 in which an appropriate flag is checked to determine whether a gearshift signal, e.g. a gearshift signal for shifting from second to third gear as shown in FIG. 4, has been output. When the result is NO, the program is immediately terminated. In this case, a desired hydraulic control pressure is determined based on the degree of throttle opening θTH in accordance with predetermined characteristics for the gear concerned.

When S10 finds that the gearshift signal has been output, the program goes to S12 in which it is checked whether the clutch has begun to slip. When the supply of hydraulic (oil) pressure to the clutch of the current gear to be released (the clutch C2 of the second gear in this example) is removed in response to the gearshift signal, the clutch (clutch C2) begins to slip. S12 Judges whether or not slipping of the clutch has started by comparing the clutch slip rate ECL with an appropriate value such as 1.01. The clutch slip rate ECL is defined or calculated as:

Clutch slip rate ECL=(Main shaft rotational speed NM/Countershaft rotational speed NC)×Gear ratio.

The gear ratio in this equation is changed from that of the current gear to be released to that of the gear to be engaged at the time clutch slip is detected.

When the result in S12 is NO, the program goes to S14 in which the value of a desired rotational speed change rate Delta NMR is set to 0. Therefore, as mentioned earlier, the desired hydraulic control pressure is determined based on the degree of throttle opening θTH in accordance with the predetermined characteristics for the gear concerned. The desired rotational speed change rate Delta NMR is defined as the change rate of the rotational speed NM of the main shaft MS (the transmission input shaft).

When, in a succeeding program cycle, S12 finds that the clutch has begun to slip, the program goes to S16 in which it is checked whether the clutch slip rate ECL exceeds a first reference value ECL1, in other words, it is checked whether the clutch slip rate ECL has turned to be less than ECL1.

As shown in the timing chart of FIG. 4, after the clutch has begun to slip, i.e., after the start of the gearshift operation, the clutch slip rate ECL is made large up to the time that the supply of hydraulic pressure to the destination gear to be engaged (e.g., the third gear clutch C3) starts and substantial engagement of the destination gear begins, so as to reduce the time lag and shorten the gearshift time.

Therefore, when S16 finds that the clutch slip rate ECL has changed to equal to or below the first reference value ECL1, the program goes to S18 in which the desired rotational speed change rate Delta NMR is set to a relatively large value shown as Delta NMA in FIG. 4.

The program then goes to S20 in which the actual rotational speed change rate Delta NM of the main shaft MS (calculated as the first difference between the rotational speed NM detected in the preceding program (control) cycle and the rotational speed NM in the current program (control) cycle) is obtained, and the hydraulic control pressure P of the linear solenoid SL5 for controlling the hydraulic pressure supplied to the clutch (e.g., the third gear clutch C3) is determined so as to reduce the error between the actual rotational speed change rate Delta NM and the desired rotational speed change rate Delta NMR, namely, so as to bring the actual rotational speed change rate Delta NM to the desired rotational speed change rate Delta NMA.

The CPU 17 of the ECU therefore determines the duty ratio of the linear solenoid SL5 for obtaining the determined hydraulic control pressure P and the result is output through the output circuit 21. This state is sustained until substantial engagement of the destination gear clutch C3 begins and the clutch slip rate ECL converges as far as the first reference value ECL1.

When, in a succeeding program cycle, S16 finds that the clutch slip rate ECL has exceeded the first reference value ECL1, the program goes to S24 in which it is checked whether the clutch slip rate ECL has exceeded a second reference value ECL2. So long as the result continues to be NO, the program goes to S26 in which the desired rotational speed change rate Delta NMR is set to a relatively small value Delta NMB, and to S20 in which the hydraulic control pressure P is determined so as to bring the actual value Delta NM to the desired value Delta NMB.

With the arrangement, once substantial engagement has started, therefore, the engagement proceeds gradually and the occurrence of gearshift shock is prevented. This state is sustained until S24 finds that the clutch slip rate ECL exceeds the second reference value ECL2 indicating the completion of substantial engagement, at which time the program goes to S14 and the desired value Delta NMR is set to zero.

As described in the foregoing, in this embodiment, the engagement state of the clutches (frictional engaging elements) is detected from the clutch slip rate ECL, the desired change rate delta NMR of the rotational speed of the transmission input shaft (the main shaft rotational speed NM) during the gearshift operation period (shown as the feedback (F/B) control period in FIG. 4) is set based thereon, and the hydraulic pressures supplied to the releasing and engaging clutches are controlled for bringing the actual rotational speed change rate to the desired value. Since the clutch engagement state can therefore be controlled to the prescribed value irrespective of the temperature of the oil (ATF) and aging of the clutches, it is at all times possible to secure optimum gearshift characteristics and to avoid the occurrence of gearshift shock.

While in the foregoing description the gearshifting period was divided into two parts and only two desired change rates differing in magnitude were defined, it is alternatively possible to further subdivide the period and define three or more desired change rates.

While the engagement state of the clutches (frictional engaging elements) was ascertained from the slip rates of the clutches, it can instead be ascertained from the slip amounts.

While the engagement state of the clutches (frictional engaging elements) was ascertained both for the releasing and engaging clutches, it is alternatively possible to ascertain for the engagement state for either of the clutches.

It is also possible to ascertain the engagement state of the clutches (frictional engaging elements) by installing a hydraulic pressure sensor to detect the clutch hydraulic pressure.

While the invention has thus been shown and described with reference to the specific embodiments, it should be noted that the invention is in no way limited to the details of the described arrangements, and changes and modifications may be made without departing from the scope of the appended claims.

What is claimed is:

1. A system for controlling hydraulic pressure for use in a hydraulically operated vehicle transmission, said system comprising:

a plurality of frictional engaging elements capable of being installed in the vehicle transmission;

a hydraulic pressure supplying circuit for discharging hydraulic pressure from one of said plurality of frictional engaging elements and for supplying hydraulic pressure to another one of said plurality of frictional engaging elements to bring said one and another one of said plurality of frictional engaging elements into operation such that gear shifting is effected in the vehicle transmission;

first shaft rotational speed detecting means for detecting a first rotational speed of a shaft input to said vehicle transmission which changes at a time of said gear shifting;

hydraulic pressure control means for controlling hydraulic pressure such that the rotational speed of the shaft changes following a desired rotational speed change rate; and engagement state detecting means for detecting an engagement state of at least either of said one and another one of said plurality of frictional engaging elements, wherein said engagement state detecting means includes:
  second shaft rotational speed detecting means for detecting a second rotational speed of a shaft output from said vehicle transmission,
  slip rate calculating means for calculating a slip rate of said one of said plurality of frictional engaging elements based on the detected first and second rotational speeds, and
  comparing means for comparing the slip rate with a first reference value to define a first period in which said desired rotational speed change rate is set to be a first predetermined value when the slip rate does not exceed the first reference value, and a second period in which said desired rotational speed change rate is set to be a second predetermined value when the slip rate exceeds the first reference value.

2. A system according to claim 1, wherein said slip rate calculating means calculates a second slip rate of said another one of said plurality of frictional engaging elements based on the detected first and second rotational speeds, and wherein said comparing means compares the second slip rate with a second reference value and defines the second period when the first slip rate exceeds the first reference value and the second slip rate does not exceed the second reference value.

3. A system according to claim 1, wherein said first predetermined value is larger than said second predetermined value.

4. A system according to claim 1, wherein said slip rate calculating means calculates the slip rate by dividing the first rotational speed by the second rotational speed and by multiplying a ratio of a gear engaged by said one of said plurality of frictional engaging elements.

5. A system according to claim 2, wherein said slip rate calculating means calculates the second slip rate by dividing the first rotational speed by the second rotational speed and by multiplying a ratio of a gear engaged by said another of said plurality of frictional engaging elements.

* * * * *